United States Patent
Patel et al.

(10) Patent No.: US 11,711,036 B1
(45) Date of Patent: Jul. 25, 2023

(54) ELECTRIC POWER GENERATION SYSTEM (EPGS) CONTROLLER EXCITATION SYSTEM ARCHITECTURE FOR VARIABLE FREQUENCY GENERATORS

(71) Applicant: Hamilton Sundstrand Corporation (HSC), Charlotte, NC (US)

(72) Inventors: Dhaval S. Patel, Schaumburg, IL (US); Adrian E. Vandergrift, Rockton, IL (US); Sunil S. Patel, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/738,331

(22) Filed: May 6, 2022

(51) Int. Cl.
*H02P 9/02* (2006.01)
(52) U.S. Cl.
CPC ...................... *H02P 9/02* (2013.01)
(58) Field of Classification Search
CPC ....................................................... H02P 9/04
See application file for complete search history.

(56) References Cited

U.S. PATENT DOCUMENTS

| | | | |
|---|---|---|---|
| 4,625,160 A * | 11/1986 | Hucker | H02K 3/16 310/83 |
| 4,684,873 A | 8/1987 | Glennon | |
| 8,975,876 B2 | 3/2015 | Rozman et al. | |
| 9,257,889 B2 | 2/2016 | Rozman et al. | |
| 10,027,210 B2 | 7/2018 | Spierling et al. | |
| 10,326,394 B2 * | 6/2019 | Rocha | F02N 11/0866 |
| 10,425,026 B2 | 9/2019 | Gao et al. | |
| 2017/0019047 A1 * | 1/2017 | Rozman | H02P 9/00 |
| 2021/0211028 A1 | 7/2021 | Ronchetto | |

* cited by examiner

*Primary Examiner* — Sean Gugger
(74) *Attorney, Agent, or Firm* — Locke Lord LLP; Joshua L. Jones; Scott D. Wofsy

(57) ABSTRACT

A system includes a generator control unit (GCU). The GCU includes a first rectifier and a second rectifier. Each of the first rectifier and the second rectifier has a separate input to receive AC power from a separate respective permanent magnet generator (PMG). A method includes supplying AC power from a first PMG of a variable frequency generator (VFG) to a first rectifier of a generator control unit GCU that is operatively connected to control the VFG. The method includes supplying AC power from a second PMG to a second rectifier of the GCU. The first PMG supplies a lower AC voltage to the first rectifier than the second PMG supplies to the second rectifier.

12 Claims, 1 Drawing Sheet

ELECTRIC POWER GENERATION SYSTEM (EPGS) CONTROLLER EXCITATION SYSTEM ARCHITECTURE FOR VARIABLE FREQUENCY GENERATORS

BACKGROUND

1. Field

The present disclosure relates to controller excitation systems, and more particularly to controller excitation systems for variable frequency generators (VFG's).

2. Description of Related Art

Electric Power Generation System (EPGS) controller excitation system architecture can be utilized on variable frequency systems. The typical system utilizes three stages (a permanent magnet generator (PMG), Excitation, and Main Machine) in order to control the output voltage of the system under any load condition.

One problem with this system is for a VFG application the excitation current requirements and the power supply requirements create a large design space. For VFG applications the excitation requirements drive high input power and voltage requirements for the exciter drive, whereas the power supply input power and voltage requirements are much lower. For VFG applications, the exciter current requirements span a large range. The minimum speed operation drives currents for the overloads to 2× and 3× times the values that are seen on constant speed applications. The excitation requirement typically forces the sizing of the PMG. Because PMGs have fixed fields (i.e. magnets on the rotor) the field strength during operation is only dictated by frequency (as speed increases both voltage and power capacity increases). The high voltage at high speed drives the GCU power supply design complexity and component sizing because the power supply is converting the high voltage to 28 VDC at a low power level, for example.

A secondary problem with the system is decoupling the exciter drive from the power supply. A common DC source for the HVPS (high voltage power supply) and the exciter drive imposes constraints on the HVPS input voltage range during certain generator fault conditions. To address these constraints additional transient suppressors are often required at the HVDC input.

The conventional techniques have been considered satisfactory for their intended purpose. However, there is an ever present need for improved systems and methods for controller excitation system architectures for variable frequency generators. This disclosure provides a solution for this need.

SUMMARY

A system includes a generator control unit (GCU). The GCU includes a first rectifier and a second rectifier. Each of the first rectifier and the second rectifier has a separate input to receive AC power from a separate respective permanent magnet generator (PMG).

The first and second rectifiers can be configured such that the first rectifier receives a lower input AC voltage than the second rectifier. The first and second rectifiers can also be configured such that the first rectifier outputs a lower DC voltage than the second rectifier.

The GCU can include a low voltage power supply (LVPS) operatively connected to receive DC power output from the first rectifier. The LVPS can be configured to convert DC power received from the first rectifier to a lower voltage for output. The first rectifier and the LVPS can be directly connected together with or without an intervening High Voltage Power Supply stepping down voltage between the first rectifier and the LVPS.

The GCU can include a controller operatively connected to receive DC power from the LVPS. The controller can be configured to output a control signal for excitation of a variable frequency generator (VFG).

The GCU can include an exciter drive operatively connected to receive the control signal from the controller. The exciter drive can be configured to output DC exciter current to the VFG. The exciter drive can be operatively connected to receive DC power from the second rectifier.

The system can include a variable frequency generator (VFG). The VFG can include a first permanent magnet generator (PMG) operatively connected to provide AC power to the first rectifier. A second PMG can be operatively connected to provide AC power to the second rectifier.

The VFG can include an exciter operatively connected to receive DC exciter current from the GCU. The exciter can be configured to output AC power.

The VFG can include a rotating rectifier operatively connected to receive the AC power from the exciter. The rotating rectifier can be configured to output DC power.

The VFG can include a main machine operatively connected to receive the DC power from the rotating rectifier. The main machine can be configured to output AC power to a generator load.

A method includes supplying AC power from a first permanent magnet generator (PMG) of a variable frequency generator (VFG) to a first rectifier of a generator control unit (GCU) that is operatively connected to control the VFG. The method includes supplying AC power from a second PMG to a second rectifier of the GCU. The first PMG supplies a lower AC voltage to the first rectifier than the second PMG supplies to the second rectifier.

The method can include powering an exciter drive of the GCU with DC power from the second rectifier. The method can include powering an exciter of the VFG with DC power from the exciter drive. It is contemplated that the method can include powering a controller of the GCU with DC power derived from the first rectifier. The method can include using the exciter to drive a main machine of the VFG to power a generator load.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
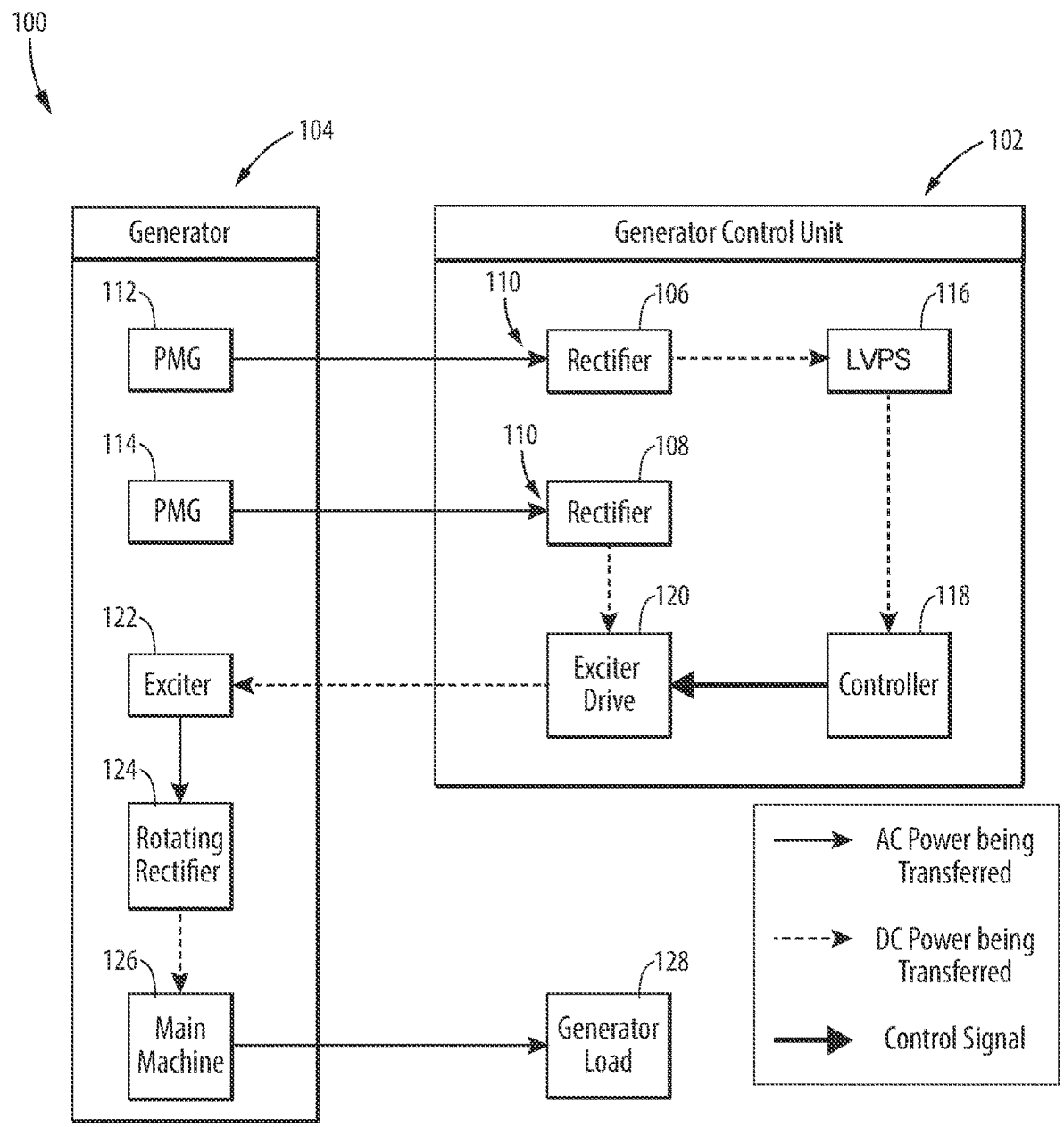
FIG. 1 is a schematic view of an embodiment of a system constructed in accordance with the present disclosure, showing the interconnections of the generator control unit (GCU) and the variable frequency generator (VFG).

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to decouple power for the controller of a generator control unit (GCU) from power for the exciter drive, while also resolving the discrepancy between excitation requirements and power supply requirements for the controller.

The system 100 includes a generator control unit (GCU) 102 operatively connected to a variable frequency generator (VFG) 104. The GCU 102 includes a first rectifier 106 and a second rectifier 108. The first rectifier 106 and the second rectifier 108 have separate inputs 110 to receive AC power from separate respective permanent magnet generators (PMGs) 112, 114 of the VFG 104.

The first and second rectifiers 106, 108 are configured such that the first rectifier 106 receives a lower input AC voltage than the second rectifier 108. The first and second rectifiers 106, 108 are also configured such that the first rectifier 106 outputs a lower DC voltage than the second rectifier 108. The rectifiers 106, 108 can each be a six pulse rectifier with a snubber circuit to condition the DC waveform, or any other suitable type of rectifier.

The GCU 102 includes a low voltage power supply (LVPS) 116 operatively connected to receive DC power output from the first rectifier 106. The LVPS 116 is configured to convert DC power received from the first rectifier to a lower voltage for output. The first rectifier 106 and the LVPS 116 can be connected together with or without an intervening High Voltage Power Supply stepping down voltage between the first rectifier 106 and the LVPS 116.

The GCU 102 includes a controller 118 operatively connected to receive DC power from the LVP 116. The controller 118 is configured to output a control signal for excitation of the VFG 104. The controller 118 can be a DSP (digital signal processor) or FPGA (field programmable gate array) based controller which controls the generator exciter current. The controller 118 receives voltage and current inputs from the system 100 and sets the excitation requirements to meet the load demand on the VFG 104. The controller 118 does this by setting the duty cycle of the exciter drive 120 to achieve an excitation current.

The GCU 102 includes an exciter drive 120 operatively connected to receive the control signal from the controller 118. The exciter drive 120 is configured to output DC exciter current to the VFG 104. The exciter drive 120 is operatively connected to receive its DC power input from the second rectifier 108. The exciter drive 120 can use a two switch forward configuration to control the exciter current. The duty cycle for the switches in the two switch forward configuration is set by the controller 118.

The VFG 104 includes a first PMG 112 operatively connected to provide AC power to the first rectifier 106. The second PMG 114 of the VFG 104 is operatively connected to provide AC power to the second rectifier 108. Each PMG 112, 114 can be a permanent magnet generator, having a three phase armature on the stator of the VFG 104 and a rotating field which has a set of magnets creating the field. Each respective PMG output is three phase AC power. In some instances the power can be single phase AC.

The VFG 104 includes an exciter 122 operatively connected to receive DC exciter current from the GCU 102, i.e. from the exciter driver 120. The exciter 122 is configured to output AC power. The exciter 122 can be a wound field synchronous machine, e.g. including a three phase rotating armature and a stationary field winding. The exciter 122 can be a brushless exciter. The input to the exciter 122 is DC and the output of the exciter 122 is AC.

The VFG 104 includes a rotating rectifier 124 operatively connected to receive the AC power from the exciter 122. The rotating rectifier 124 is configured to output DC power to the main machine 126 of the VFG 104. The rotating rectifier 124 converts the AC power from the exciter 122 to DC. The DC output is applied to the main field rotor of the main machine 126.

The main machine 126 is configured to output AC power to the generator load 128. The main machine 126 can be a wound field synchronous machine, where the rotor is a wound field and the stator is a three phase armature. The main machine 126 produces the output power for the VFG 104, where the load 128 is connected to the outputs of the VFG 104. The main machine voltage and current are controlled by the field current input from the exciter driver 120.

For aircraft system the load 128 is a constant voltage load. The GCU 102 can sense the voltage at the point of regulation and adjust excitation such that the voltage is constant. In the event of a fault or failure of a load 128, the GCU 102 has the ability to adjust the excitation in order to clear the fault or to shut the system down completely so that the failure does not propagate.

A method includes supplying AC power from a first PMG 112 of a VFG 104 to a first rectifier 106 of a GCU 102 that is operatively connected to control the VFG 104. The method includes supplying AC power from a second PMG 114 to a second rectifier 108 of the GCU 102. The first PMG 112 supplies a lower AC voltage to the first rectifier 106 than the second PMG 114 supplies to the second rectifier 108.

The method includes powering an exciter drive 120 of the GCU with DC power from the second rectifier 108. The method includes powering an exciter 122 of the VFG with DC power from the exciter drive 120. It is contemplated that the method can include powering a controller 118 of the GCU 102 with DC power derived directly from the first rectifier 106 with or without an intervening power converter to step the voltage down. The method can also include using the exciter 122, e.g. including using the rotating rectifier 124, to drive a main machine 126 of the VFG 104 to power a generator load 128.

The methods and architecture disclosed herein allow for PMG 112 to provide power for the power supply of the controller 118, and allow for PMG 114 to provide power for the Exciter drive 120. Separate PMGs 112, 114 can be achieved by placing two PMG assemblies in the generator (VFG 104) or by using a single PMG assembly and splitting the winding such that there are two three phase windings in the PMG assembly (a low voltage low power winding for the first rectifier 106 and power supply and a higher power winding for first rectifite 106 and the DC to DC converter).

Potential benefits of systems and methods as disclosed herein include significant cost reduction by eliminating the need for a high voltage power supply in the GCU. There is also a potential benefit of elimination of transient suppressing components to address generator fault conditions.

The methods and systems of the present disclosure, as described above and shown in the drawings, provide for decoupling power for the controller of a generator control unit (GCU) from power for the exciter drive, while also resolving the discrepancy between excitation requirements and power supply requirements for the controller. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a generator control unit (GCU) including:
   a first rectifier; and
   a second rectifier, wherein each of the first rectifier and the second rectifier has a separate input to receive AC power from a separate respective permanent magnet generator (PMG); and
   a variable frequency generator (VFG) including:
   a first permanent magnet generator (PMG) operatively connected to provide AC power to the first rectifier; and
   a second PMG operatively connected to provide AC power to the second rectifier;
   wherein the VFG further comprises an exciter operatively connected to receive DC exciter current from the GCU, wherein the exciter is configured to output AC power.

2. The system as recited in claim 1, wherein the GCU further comprises a low voltage power supply (LVPS) operatively connected to receive DC power output from the first rectifier, wherein the LVPS is configured to convert DC power received from the first rectifier to a lower voltage for output.

3. The system as recited in claim 2, wherein the first rectifier and the LVPS are connected together without an intervening High Voltage Power Supply stepping down voltage between the first rectifier and the LVPS.

4. The system as recited in claim 2, wherein the GCU further comprises a controller operatively connected to receive DC power from the LVPS, wherein the controller is configured to output a control signal for excitation of a variable frequency generator (VFG).

5. The system as recited in claim 4, wherein the GCU further comprises an exciter drive operatively connected to receive the control signal from the controller, wherein the exciter drive is configured to output DC exciter current to the VFG.

6. The system as recited in claim 5, wherein the exciter drive is operatively connected to receive DC power from the second rectifier.

7. The system as recited in claim 1, wherein the first and second rectifiers are configured such that the first rectifier receives a lower input AC voltage than the second rectifier and such that the first rectifier outputs a lower DC voltage than the second rectifier.

8. The system as recited in claim 1, wherein the VFG further comprises a rotating rectifier operatively connected to receive the AC power from the exciter, wherein the rotating rectifier is configured to output DC power.

9. The system as recited in claim 8, wherein the VFG further comprises a main machine operatively connected to receive the DC power from the rotating rectifier, wherein the main machine is configured to output AC power to a generator load.

10. A method comprising:
    supplying AC power from a first permanent magnet generator (PMG) of a variable frequency generator (VFG) to a first rectifier of a generator control unit (GCU) that is operatively connected to control the VFG; and
    supplying AC power from a second PMG to a second rectifier of the GCU, wherein the first PMG supplies a lower AC voltage to the first rectifier than the second PMG supplies to the second rectifier; and
    powering an exciter drive of the GCU with DC power from the second rectifier; and
    powering an exciter of the VFG with DC power from the exciter drive.

11. The method as recited in claim 10, further comprising powering a controller of the GCU with DC power derived from the first rectifier.

12. The method as recited in claim 11, further comprising using the exciter to drive a main machine of the VFG to power a generator load.

* * * * *